United States Patent [19]

Merz

[11] Patent Number: 5,565,657
[45] Date of Patent: Oct. 15, 1996

[54] MULTIDIMENSIONAL USER INTERFACE INPUT DEVICE

[75] Inventor: Eric A. Merz, Webster, N.Y.

[73] Assignee: Xerox Corporation, Stamford, Conn.

[21] Appl. No.: 143,608

[22] Filed: Nov. 1, 1993

[51] Int. Cl.$^6$ ................................................... G08C 21/00
[52] U.S. Cl. ........................................................ 178/18
[58] Field of Search ........................ 178/18, 19; 345/173, 345/174; 364/709.01, 709.11; 341/34

[56] References Cited

U.S. PATENT DOCUMENTS

| | | | |
|---|---|---|---|
| 3,748,571 | 7/1973 | Kurtz | 323/74 |
| 4,203,088 | 5/1980 | Sado et al. | 338/114 |
| 4,268,815 | 5/1981 | Eventoff et al. | 338/69 |
| 4,455,450 | 6/1984 | Margolin | 178/18 |
| 4,489,302 | 12/1984 | Eventoff | 338/99 |
| 4,517,546 | 5/1985 | Kakuhashi et al. | 338/320 |
| 4,570,149 | 2/1986 | Thornburg et al. | 178/18 X |
| 4,621,178 | 11/1986 | Taguchi et al. | 219/10.55 |
| 4,706,068 | 11/1987 | Eberhard | 340/365 |
| 4,739,299 | 4/1988 | Eventoff et al. | 338/99 |
| 4,810,992 | 3/1989 | Eventoff | 338/99 |
| 4,866,412 | 9/1989 | Rzepczynski | 338/114 |
| 4,866,646 | 9/1989 | Nakamura et al. | 364/709.11 |
| 4,963,702 | 10/1990 | Yaniger et al. | 178/18 |
| 4,983,786 | 1/1991 | Stevens et al. | 178/18 |
| 4,990,725 | 2/1991 | Mizzi | 178/18 |
| 5,053,585 | 10/1991 | Yaniger | 178/18 |
| 5,262,778 | 11/1993 | Saunders | 341/34 |

OTHER PUBLICATIONS

Xerox Disclosure Journal—"Editing Pad Using Force Sensitive Resistors", by Martin et al. vol. 17, No. 4 Jul./Aug. p. 227.

*Primary Examiner*—Stephen Chin
*Assistant Examiner*—Kevin Kim
*Attorney, Agent, or Firm*—Don L. Webber

[57] ABSTRACT

An user interface for accepting three dimensional information (such as x, y and z axis positioning information) for input into a computer, printer, copier or other electronic device. In addition to indicating the x and y axis position coordinates of the input, the input pad of the user interface also registers a z axis coordinate based on the pressure applied by the operator on the outer surface of the input pad. This z axis force component is enabled by the force sensing layers of parallel conductors in the input pad.

28 Claims, 9 Drawing Sheets

MULTIDIMENSIONAL USER INTERFACE INPUT DEVICE

The present invention relates to a multidimensional user interface input device, and more particularly to a force sensing variable array for inputting information into a computerized apparatus.

User-machine interface devices are useful in a broad range of applications when providing machine instructions to a multifunctional and adjustable copying and/or printing devices. In electrophotographic applications such as xerography, users may wish to input and edit a variety of types of information (such as graphics, photos or text), as well as adjust and modify a variety of machine parameters (such as copy or print contrast, color, and others).

Traditional input devices such as pushbuttons, keyboards, two dimensional "edit pads" and other devices often limit user options, or may prolong and complicate the implementation of a desired set of selections. For example, if an operator wishes to darken the shade of red for in a designated area of an electronic document or digitized image, known input pads may only permit the operator to make two-dimensional inputs (by designation of a point or area in a plane). In order for the operator to darken the shade of red found in that area, the operator must engage other means (keyboard, pushbuttons, etc.) or change the function of the input pad in order to complete the desired task. Other input/editing pad implementations in which simultaneous input on more than a single plane or two parameters is required can likewise make operator tasks more difficult. Graphics, design, and analytical implementations (such as construction/engineering applications, perspective renderings, solid object modeling, stress design/analysis, etc.) are just a few examples of situations in which difficulties can arise when operators may be undesirably forced to use a keyboard or a two dimensional input device.

More specifically, in a digital printer or copier applications, a raster output scanner controlled (in part) by such position and force sensing input devices complimentarily to other electronic subsystems can be adapted to receive signals from a user input device and associated computer and to translate these inputs into suitable signals so as to record an electrostatic latent image corresponding to the desired document to be reproduced on a photoreceptor. In a digital copier, an input device such as a raster input scanner may likewise be controlled by an input device and an electronic subsystem adapted to provide an electrostatic latent image to the photoreceptor. In a light lens copier, the photoreceptor may be exposed to a pattern of light or obtained from the original image to be reproduced, to be thereafter modified by an input device prior to image formation on the photoreceptor. In each case, the resulting pattern of charged and discharged areas on photoreceptor form an electrostatic charge pattern (an electrostatic latent image) conforming to the desired resultant image.

The electrostatic image on the photoreceptor may be developed by contacting it with a finely divided electrostatically attractable toner. The toner is held in position on the photoreceptor image areas by the electrostatic charge on the surface. Thus, a toner image is produced in conformity with a light image of the original beam reproduced. Once each toner image is transferred to a substrate, and the image affixed thereto form a permanent record of the image to be reproduced. In the case of multicolor copiers and printers, the complexity of the image transfer process is compounded, as four or more colors of toner may be transferred to each substrate sheet. Once the single or multicolored toner is applied to the substrate, it is permanently affixed to the copy sheet by fusing so as to to create the single or multicolor copy or print. Multidimensional Input devices can speed and simplify the operator actions required to implement document coloration.

Following the photoreceptor to substrate toner transfer process, it is necessary to at least periodically clean the charge retentive surface of the photoreceptor. In order to obtain the highest quality copy or print image, it is generally desirable to clean the photoreceptor each time toner is transferred to the substrate. In addition to removing excess or residual toner, other particles such as paper fibers, toner additives and other impurities (hereinafter collectively referred to as "residue") may remain on the charged surface of the photoreceptor. Cleaning blades and brushes may be employed to remove residue from a photoreceptor.

The various copy and print quality and characteristics desired by an operator may preferably be inputted according to a three dimensional input device. Rather than limiting input to two dimension (such as x and y coordinate), a device capable of accepting three dimensional (x, y and z coordinate) input may simplify, enhance, expedite and add flexibility to the desired output, whether that output relates to graduated intensity controls, three dimensional computer or object design or formation, time sensitive input instructions, or other applications.

Various approaches have been employed to input information into a device using an input or edit pad, including the following disclosures that may be relevant:

U.S. Pat. No. 5,053,585
Patentee: Yaniger
Issued: Oct. 1, 1991

U.S. Pat. No. 4,963,702
Patentee: Yaniger et al.
Issued: Oct. 16, 1990

U.S. Pat. No. 4,866,646
Patentee: Nakamura et al.
Issued: Sep. 12, 1989

U.S. Pat. No. 4,866,412
Patentee: Rzepczynski
Issued: Sep. 12, 1989

U.S. Pat. No. 4,810,992
Patentee: Eventoff
Issues: Mar. 7, 1989

U.S. Pat. No. 4,739,299
Patentee: Eventoff et al.
Issued: Apr. 18, 1988

U.S. Pat. No. 4,706,068
Patentee: Eberhard
Issued: Nov. 10, 1987

U.S. Pat. No. 4,621,178
Patentee: Taguchi et al.
Issued: Nov. 4, 1986

U.S. Pat. No. 4,517,546
Patentee: Kakuhashi et al.
Issued: May 14, 1985

U.S. Pat. No. 4,489,302
Patentee: Eventoff
Issued: Dec. 18, 1984

U.S. Pat. No. 4,455,450
Patentee: Margolin
Issued: Jun. 19, 1984

U.S. Pat. No. 4,268,815
Patentee: Eventoff et al.
Issued: May 19, 1981

U.S. Pat. No. 4,203,088
Patentee: Sado et al.
Issued: May 13, 1980

U.S. Pat. No. 3,748,571
Patentee: Kurtz
Issued: Jul. 24, 1973

Xerox Disclosure Journal
Martin et al.
Vol. 17, No. 4, p. 227, July/August 1992

Relevant portions of the foregoing disclosures may briefly be described as follows:

U.S. Pat. No. 5,053,585 to Yaniger discloses a multipurpose keyboard incorporating an electronic pressure sensing device and a digitizer pad featuring spatial minimization of a pressure contact area capable of locating the leading and trailing edges of the pressure contact area. A processor coupled to the electronic pressure sensing device is programmed to sense when various regions on a simple, fully interchangeable template overlay and the underlying electronic pressure sensing device are depressed. The sensed region is associated by the processor with a particular key identification on the template overlay. The variation of the resistance in the digitizer pad enables the processor to detect the actuation of more than one key on the template overlay at the same time to detect key rollover.

U.S. Pat. No. 4,963,702 to Yaniger et al. discloses a digitizer pad that includes at least one digitizer ply where each digitizer ply has a first and a second resistor strip, each with a resistance gradient along its length, oriented in a spaced apart relationship. A plurality of conductor traces are interconnected along the length of each resistor strip to extend toward and be interleaved between each other to define a sensor pad region. Each sensor pad region defines a dimensional direction. A shunt ply is positioned to face the sensor pad region in normally non-conducting relationship so that when a selected area is pressed into contact with the conductor traces, conduction between adjacent conductor traces via the shunt ply will occur in the selected contact area. The selected contact area has a first edge and a second edge opposite the first edge along the defined dimensional direction. A voltage source is coupled across the first resistor strip and a switch is coupled across the ends of the second resistor strip for alternately coupling one end and then the other end of the second resistor strip to a utilization. The voltage and hence the location of the first edge and then the second edge of the contact area along the dimensional direction is thereby determined.

U.S. Pat. 4,866,646 to Nakamura et al. discloses a hand held data input tablet with a character recognition section, detachably connected to a document processing and memory apparatus.

U.S. Pat. No. 4,866,412 to Rzepczynski discloses parallel arrays of flat conductive materials superimposed on traversly disposed rows of insulated wire, so as to identify an object by contact or select an object from among a collection of objects.

U.S. Pat. No. 4,810,992 to Eventoff discloses a digitizer pad having at least two base plies, each having thereon at least three terminals, a resistor ply disposed between two of the terminal with a plurality of conductors extending from each resistor ply which are spaced apart and interleaved with a plurality of conductors extending from each third terminal. The conducting surfaces of the respective base plies face each other and are sandwiched about a nonconductive ply that includes a pressure sensitive conductive layer on each side, the area of which layer covers a portion of the area encompassed by the interleaved conductors on each base ply. The resistor plies and conductors on each base ply are at predetermined angles to those on the base ply, hence the conductors of each base ply form two predefined axes. A voltage source is sequentially coupled, by suitable switching means, across a selected pair of terminals on each ply to measure the selected location along the parameter dimension defined by the terminals across which the voltage source is coupled. Hence, the spatial location of a force applied to the digitizer pad along any one or more axes in a plane is determinable as well as the magnitude of the force applied generally perpendicular to that plane.

U.S. Pat. No. 4,739,299 to Eventoff et al. discloses a digitizer pad that includes at least two sets of terminals with a resistor ply disposed terminals of each set. The resistor ply has an electrical contact surface with a resistance gradient profile between the terminals in each set. A voltage source is sequentially coupled, by suitable switching means, across a selected subset of terminals in each set of terminals whereby the voltage at the output terminal is a measure of the selected location along the parameter dimension defined by the terminals across which the voltage source is coupled.

U.S. Pat. No. 4,621,178 to Taguchi et al. discloses an electrical signal input device for an appliance. A membrane input device includes an actuator member composed of a generally flat plate having a plurality of elongated actuator sections on a surface thereof and carrying a plurality of first electrodes disposed wholly through an opposite surface thereof and facing against the plurality of the actuator sections, a substrate disposed in conjunction with the actuator member and having a plurality of second electrodes each corresponding to one of the first electrodes. When one of the actuator sections is depressed, electric contact is made.

U.S. Pat. No. 4,517,546 to Kakuhashi et al. discloses a resistor sheet input tablet comprising two resistor sheets each provided at two opposite edges with electrodes. One rectangular resistor sheet lies perpendicularly to those on the other resistor sheet resulting in a two-dimensional input construction comprising a main resistor layer consisting of a thin metal film deposited thereon which in turn is bonded to an electrically insulating layer and a protective resistor layer formed on the surface of the main resistor layer.

U.S. Pat. No. 4,489,302 to Eventoff discloses a switch having a junction resistance which varies inversely with the pressure applied to it. The switch includes a first conductor member, a pressure-sensitive layer including a semiconducting material covering the first conductor member in intimate electrically conducting contact therewith and a second conductor member positioned in nonelectrically conducting relationship to the pressure-sensitive layer. The pressure-sensitive layer has a first surface with a multiplicity of microprotrusions of the semiconducting material which provide a multiplicity of surface contact locations. As the normally open switch is closed in response to a pressing force applied to urge the second conductor member and the first surface together, the physical contact between the microprotrusions and the second conductor increases thereby variably increasing conduction between the first conductor member and the second conductor member.

U.S. Pat. No. 4,455,450 to Margolin et ai. discloses a digitizer tablet with an air or fluid-filled pocket formed by two sealed sheets of insulating material. Perpendicular row arrays of electrical conductors defined on the inner faces of the two sheets urged into contact with each other generate the x and y coordinates for the device.

U.S. Pat. No. 4,268,815 to Eventoff et al. discloses a pressure sensitive switch having a first semiconductor composition layer disposed on top of a first conductor layer which is affixed to a first base member. A second semiconductor composition layer opposing the first semiconductor in spaced relationship thereto is disposed on a second conductor layer which is itself disposed on the bottom surface of a second support member. A third conductor layer is also disposed on the top surface of the second support member in opposing spaced-apart relationship to a fourth conductor layer disposed on the bottom surface of a third support member. The second and third support members and the affixed conductor layers and semiconductor layers are resiliently deformable in a transverse axis in response to a transverse touch force to thereby cause electrical contact between the second and third conductor layers to provide a closed switch and the first and second semiconductor layers to provide a closed switch in series with a pressure sensitive resistance.

U.S. Pat. No. 4,203,088 to Sado et al. discloses pressure sensitive multiple resistor elements in which two or more variations of resistance can be obtained by applying a single compressive force. Layered sets of electrode sheets provide the means for sensing the compressive forces to the electrodes.

U.S. Pat. No. 3,748,571 to Kurtz discloses a pressure transducer assembly which employs a flexible thin diaphragm. The diaphragm serves a dual purpose as a movable plate of a capacitor and a support for a force responsive element. A force responsive element is coupled to the capacitor to form a composite circuit network which exhibits a dual impedance proportional to deflection.

Xerox Disclosure Journal, Vol. 17, No. 4, p. 227, July/August 1992, discloses a force sensitive sensor that can detect and utilize variances on the pressure applied by an operator to an edit pad.

In accordance with one aspect of the present invention, there is provided a user interface apparatus having a conductivity sensing processor for detecting a set of x, y and z axis address components according to changes in conductivity between conductors in an input pad. The input pad includes a first level having a plurality of x direction parallel conductors individually electrically connected to and carrying a current from the processor, a compressible semiconductive layer and a second level having a plurality of y direction parallel conductors individually electrically connected to the processor, with the semiconductive layer being interposed between the first and second levels. The x and y conductors form a current carrying matrix, whereby the processor detects the x and y axis address components of pressure exerted on the first level according to an increase in conductivity between the underlying x conductors displaced towards the underlying y conductors. The processor detects the z axis address component of the pressure according to a comparison of a magnitude of the increase in conductivity between the x and y conductors to a predetermined pressure scale.

Pursuant to another aspect of the present invention, there is provided a user interface apparatus having a conductivity sensing processor for detecting unique x, y and z axis address components according to conductivity readings between conductors in an input pad. The input pad includes a first level having n repeating sets of x direction parallel conductors, each individual x conductor in each repeating set being electrically connected to and carrying a current from the processor and to each corresponding x conductor in each n repeating set of x conductors, a first compressible semiconductive layer and a second level having m repeating sets of y direction parallel conductors, with the first semiconductive layer being interposed between the first and second levels, each individual y conductor in each repeating set being electrically connected to the processor and to each corresponding y conductor in each m repeating set of y conductors, with the sets of x conductors in said first level aligned to cross said sets of y conductors in the second level so as to form a detection zone matrix, whereby an application of pressure on the first level increases conductivity between the x and y conductors crossing beneath the pressure so as to identify the x and y axis address within the detection zone and whereby the processor compares a magnitude of the increase in conductivity between the x and y conductors to a predetermined pressure scale so as to identify the unique z address component of the pressure. The input pad further includes a second compressible semiconductive layer underlying the second level and a third level having a plurality of conductive pads underlying the second compressible semiconductive layer and being electrically connected to and individually identifiable by the processor according to the detection zone matrix, whereby the processor detects the unique x and y axis address of the pressure on the first level according to increased conductivity detected between the y conductors and said conductive pad.

The present invention will be described in detail with reference to the following drawings, in which like reference numerals are used to refer to like elements. The various aspects of the present invention will become apparent as the following description proceeds and upon reference to the drawings, in which.

Figure 1:
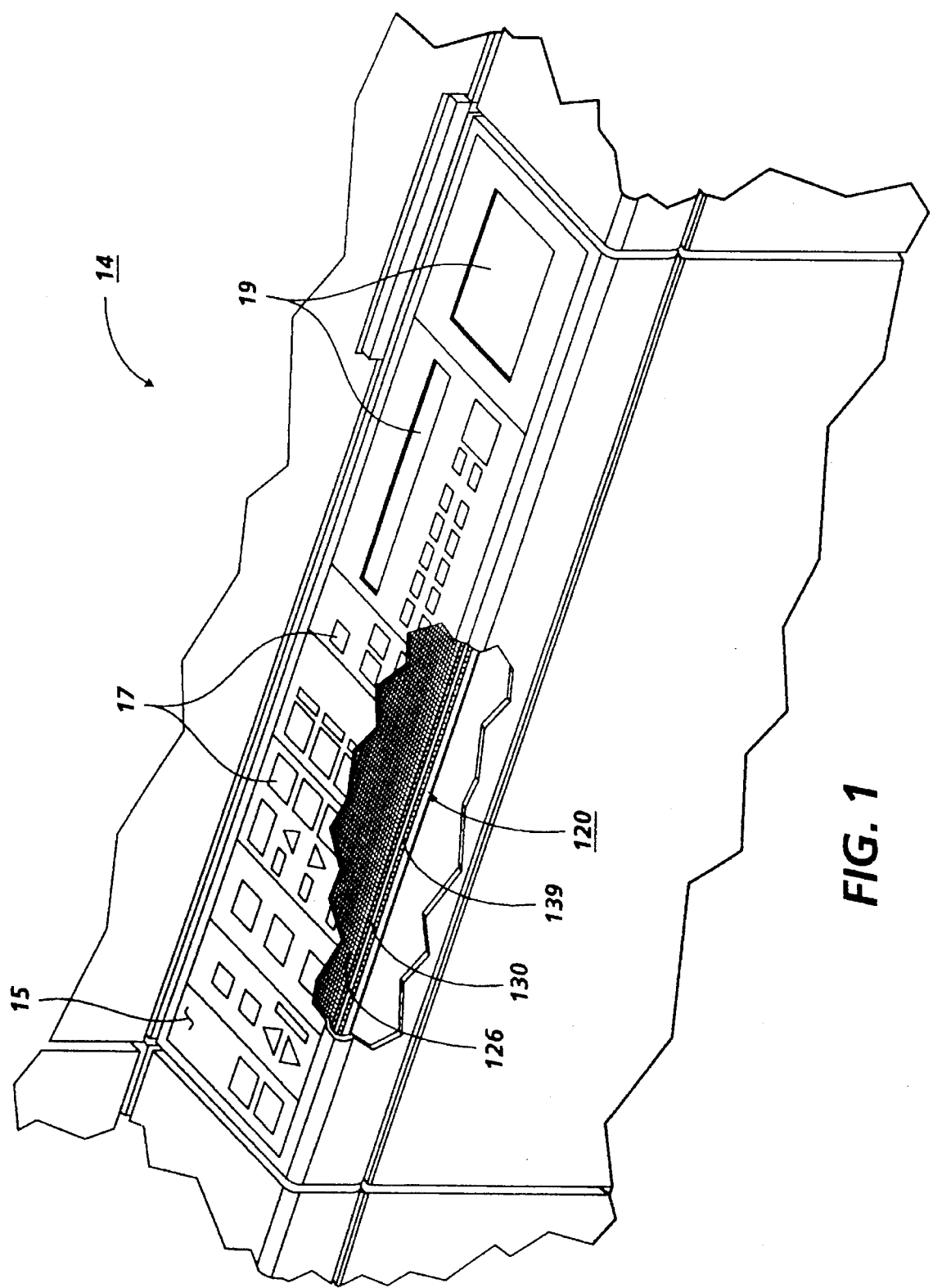
FIG. 1 is a fragmentary view, partially in section, of an input pad incorporating the force sensing input pad of the present invention.

While the present invention will hereinafter be described in connection with preferred embodiments, it will be understood that it is not intended to limit the invention to a particular embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like reference numerals have been used throughout to designate like elements. It will become evident from the following discussion that the present invention and the various embodiments set forth herein are suited for use in a wide variety of printing and copying systems, and are not necessarily limited in its application to the particular systems shown herein.

Figure 9:
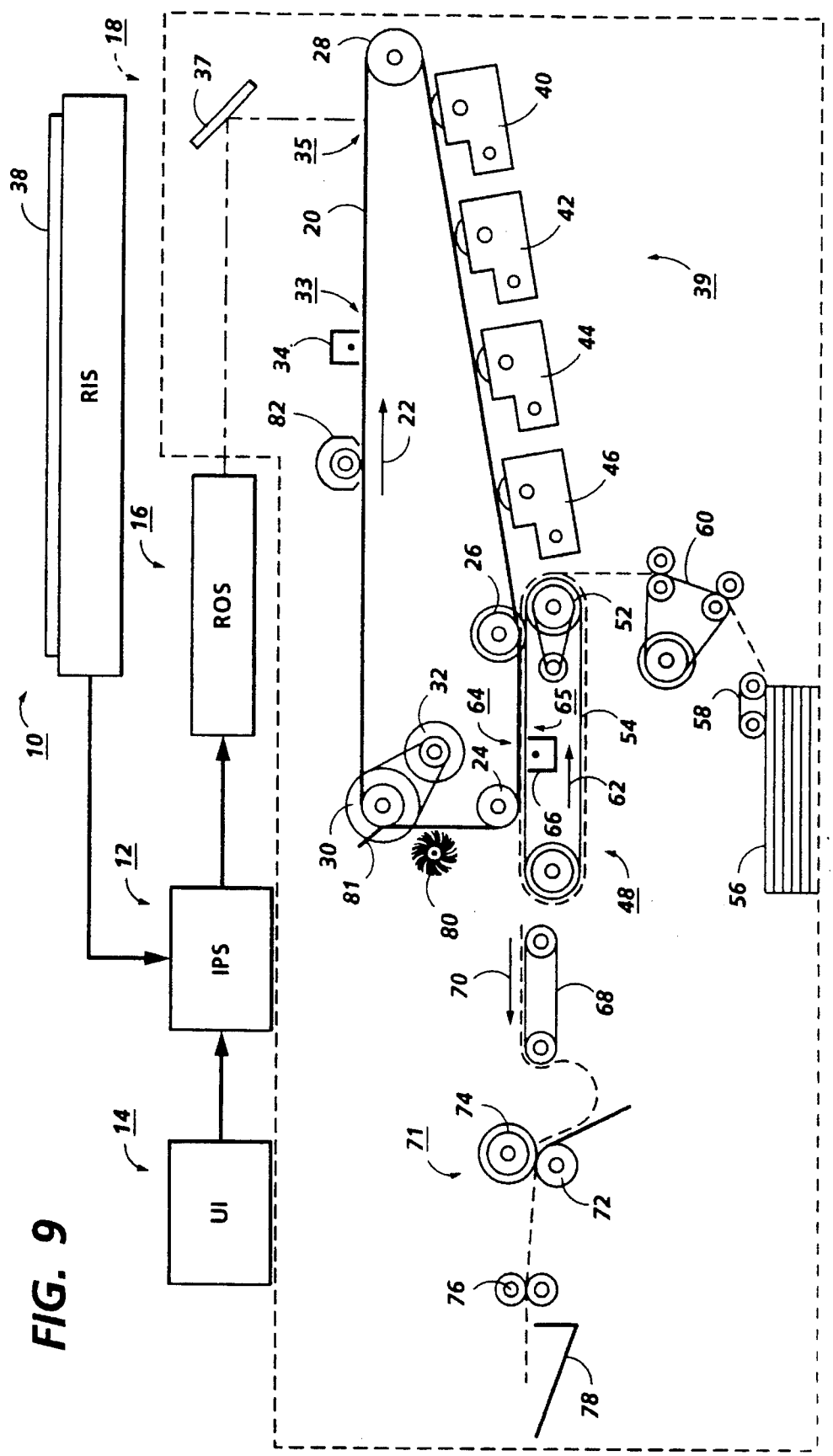
FIG. 9 is a schematic elevational view showing an exemplary electrophotographic printing machine which may incorporate the present invention therein.

To begin by way of general explanation, FIG. 9 is a schematic elevational view showing an electrophotographic printing machine which may incorporate features of the present invention therein. It will become evident from the following discussion that the present invention is equally well suited for use in a wide variety of copying and printing systems as well as many other data input and feature selection applications, and is not necessarily limited in its application to the particular systems shown herein.

As shown in FIG. 9, during operation of the printing system, a multiple color original document 38 is positioned on a raster input scanner (RIS), indicated generally by the reference numeral 10. The RIS contains document illumination lamps, optics, a mechanical scanning drive, and a charge coupled device (CCD array). The RIS captures the entire image from original document 38 and converts it to a series of raster scan lines and moreover measures a set of primary color densities, i.e. red, green and blue densities, at each point of the original document. This information is transmitted as electrical signals to an image processing system (IPS), indicated generally by the reference numeral 12. IPS 12 converts the set of red, green and blue density signals to a set of colorimetric coordinates. Computerized user interface 14 (such as is described in greater detail in association with FIGS. 1 through 8 herein) may be used to create, modify and print text and images.

The IPS contains control electronics which prepare and manage the image data flow to a raster output scanner (ROS), indicated generally by the reference numeral 16. A user interface (UI), indicated generally by the reference numeral 14, is in communication with IPS 12, as well as with other locations as desired in the printer and/or marking system, so as to control the various functions and outputs associated therewith. UI 14 enables an operator to control the various operator adjustable functions. The operator actuates the appropriate keys of UI 14 to adjust the parameters of the print or copy. UI 14 may be a force sensing input pad as described in greater detail in association with FIGS. 1 through 8 herein, for providing various operator interface functions with the printer and/or marking system. The output signal from UI 14 is transmitted to IPS 12.

The IPS then transmits signals corresponding to the desired image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three latent images which correspond to the signals transmitted from IPS 12. One latent image is developed with cyan developer material. Another latent image is developed with magenta developer material and the third latent image is developed with yellow developer material. These developed images are transferred to a copy sheet in superimposed registration with one another to form a multicolored image on the copy sheet. This multicolored image is then fused to the copy sheet forming a color copy.

With continued reference to FIG. 9, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three times to record three latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. As set forth above, UI 14 of the present invention may be used to control the various functions of the developer units indicated by reference numerals 40, 42, 44 and 46, such as color intensity, darkness, and numerous other functions.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. In FIG. 9, developer unit 40 is shown in the operative position with developer units 42, 44 and 46 being in the nonoperative position. During development of each electrostatic latent image, only one developer unit is in the operative position, the remaining developer units are in the nonoperative position. This insures that each electrostatic latent image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper 84 (not shown in FIG. 9) extends between belts 54 and moves in unison therewith. A sheet 25 is advanced from a stack of sheets 56 disposed on a tray. A friction retard feeder 58 advances the uppermost sheet from stack 56 onto a pretransfer transport 60. Transport 60 advances sheet 25 (not shown in FIG. 9) to sheet transport 48. Sheet 25 is advanced by transport 60 in synchronism with the movement of the sheet gripper. In this way, the leading edge of sheet 25 arrives at a preselected position, i.e. a loading zone, to be received by the open sheet gripper. The sheet gripper then closes securing sheet 25 thereto for movement therewith in a recirculating path. The leading edge of sheet 25 is secured releasably by the sheet gripper. As belts 54 move in the direction of arrow 62, the sheet moves into contact with the photoconductive belt, in synchronism with the toner image developed thereon. In transfer zone 64, a gas directing mechanism 100 directs a flow of gas onto sheet 25 to urge the sheet toward the developed toner image on photoconductive member 20 so as to enhance contact between the sheet and the developed toner image in the transfer zone. Further, in transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolor copy of the colored original document.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 80. A rotatably mounted fibrous brush may be positioned in the cleaning station (along with a cleaning blade, not shown) and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

FIG. 1 shows an a user interface 14 of the present invention such as may form an edit pad to an digital printer or copier. Surface 15 of user interface 14 may include a variety of predesignated zones 17 which correspond to particular functions or inputs as may be implemented by a user. Display areas 19 may be included as window portions in user interface 14, for displaying characters or images indicating the operator-engaged functions or operational stages of the digital printer or copier.

User interface 14 has a multilayer input pad 120 under surface 15. Input pad 120 includes upper pad layer 126 and lower pad layer 130 for providing three dimensional (x, y and z axis) input capability for user interface 14. Lower pad retaining layer 139 supports input pad 120 as pressure is applied to surface 15 of user interface 14. Input pad 120 accepts three dimensional information (such as x, y and z axis positioning information) and relays that information via a processor (not shown in FIG. 1) to the electronic printer shown in FIG. 9, or to a computer or other electronic device. In addition to indicating the x and y axis position coordinates on user interface 14, input pad 120 also registers a z axis coordinate based on the pressure applied by the operator on surface 15 of the user interface 14. This z axis force positioning component is enabled by the force sensing parallel conductors in upper pad layer 126 and lower pad layer 130 and/or by the the capability of input pad 120 to determine a force component according to the area of surface 15 covered by (for example) a fingertip as that fingertip is used to apply varying levels of pressure on input pad 120.

Figure 2:
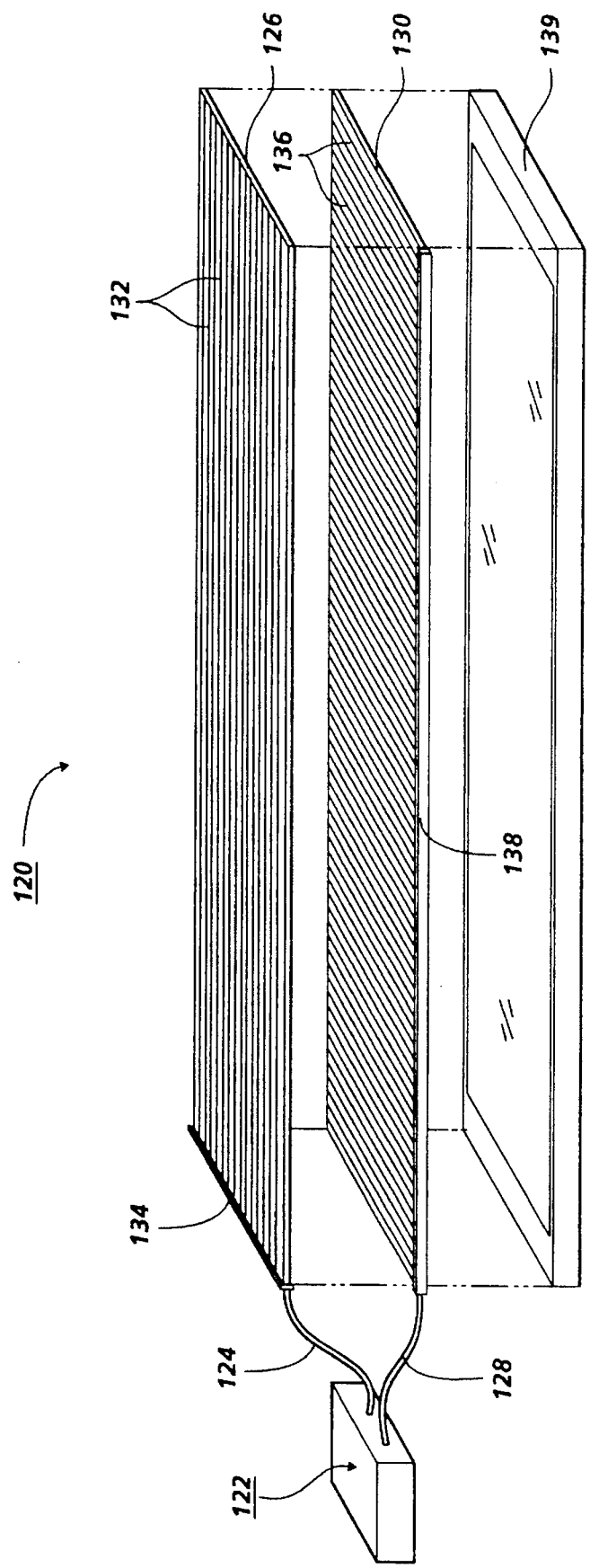
FIG. 2 is an exploded view of the pressure sensitive input pad shown in FIG. 1.

FIG. 2 shows an exploded view of a user interface 14 as shown in FIG. 1. User interface 14 has a processor 122 for processing input from wire bundle 124 attached to upper pad layer 126 and from wire bundle 128 attached to lower pad layer 130. One end of each of parallel wires 132 embedded in semiconductive upper pad layer 126 is assembled along edge 134 so as to be individually collected into wire bundle 124; likewise, one end of each of parallel wires 136 embedded in semiconductive lower pad layer 130 is assembled along edge 137 so as to be individually collected into wire bundle 128. A lower pad retaining layer 139 (optional) is also shown in FIG. 2, for providing lower support for input pad 120.

Upper pad layer 126 is placed in user interface 120 such that wires 132 cross wires 136 in lower pad layer 130 at right angles. Upper pad layer 126 (and optionally lower pad layer 130) are formed of compressible cast, sheet, or otherwise formed semiconductive material(s) surrounding wires 132 such that pressure on upper pad layer 126 causes it to deflect towards lower pad layer 130, thereby decreasing the relative distance between wires 132 and wires 136 at the point(s) and/or areas that pressure is applied to upper pad layer 126. Importantly, wires 132 can be arranged very closely, as they carry the same current from processor 122. When pressure is applied to a point on the outer surface of upper pad layer 126 (such as by a finger, pen or other object), upper pad layer 126 deflects towards lower pad 130, processor 122, and the corresponding changes in the resistance (or conductivity) between any of wires 132 in upper pad layer 126 and any of wires 136 in lower pad layer 130; processor 122 is thereby able to determine the location of the pressure relative to horizontal (x and y) address coordinates.

In addition to determining the x and y address coordinates of the pressure, processor 122 also uses information from the deflection of layered conductors (wires 132 toward wires 136) to determine a force or "z" axis component by one or or a combination of two force detection systems. Processor 122 may detect the magnitude of the decrease in resistance (or increase in conductivity) between the particular wire 132 and wire 136 at the point pressure is applied on upper layer 126 of input pad 120. Processor 122 compares the magnitude of the decrease in resistance between the particular wire 132 and particular wire 136 to a predetermined reference resistance (or conductance) level, and is thereby able to assign a force-related (z axis) component to the three-dimensional address generated by processor 122 of input pad 120. As a user presses on upper pad layer 126 (by writing, drawing or other activity), processor 122 detects pressure and traces movement in the x, y and/or z planes as that pressure and movement is provided to processor 122 by wires 132 and wires 136 as described above.

Figure 6B:
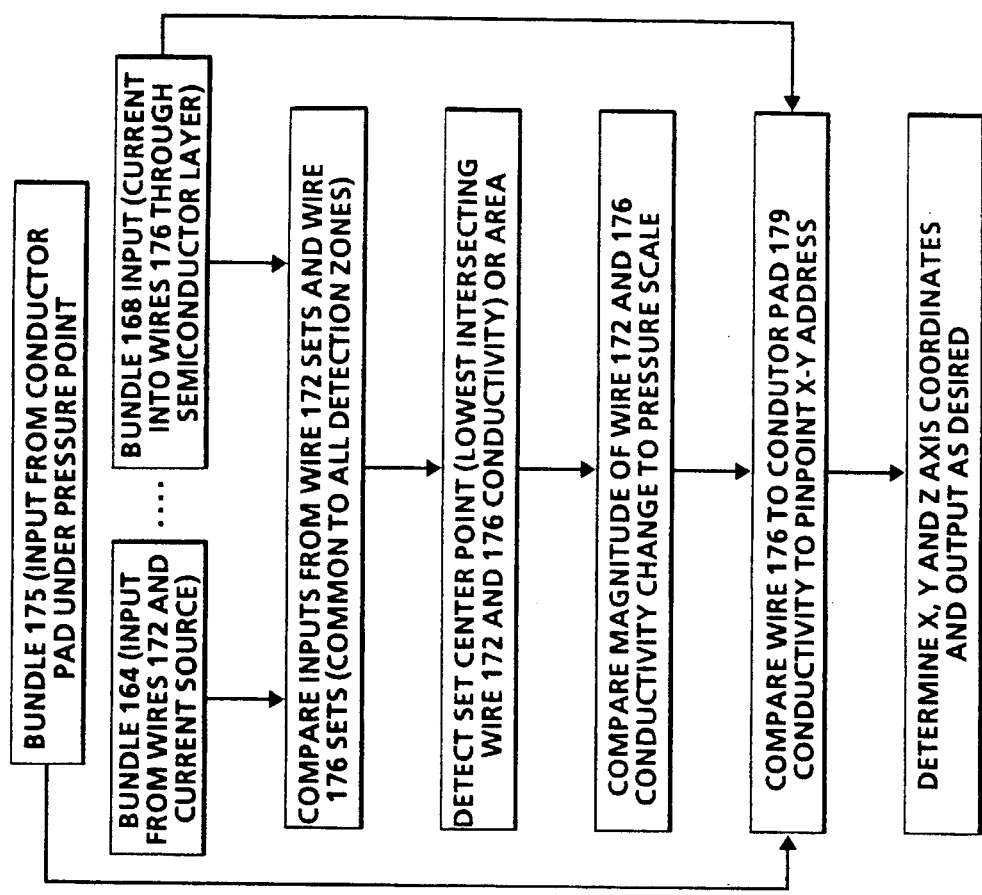
FIG. 6B is a block diagram showing another embodiment of an input pad processor of the present invention.
Figure 6A:
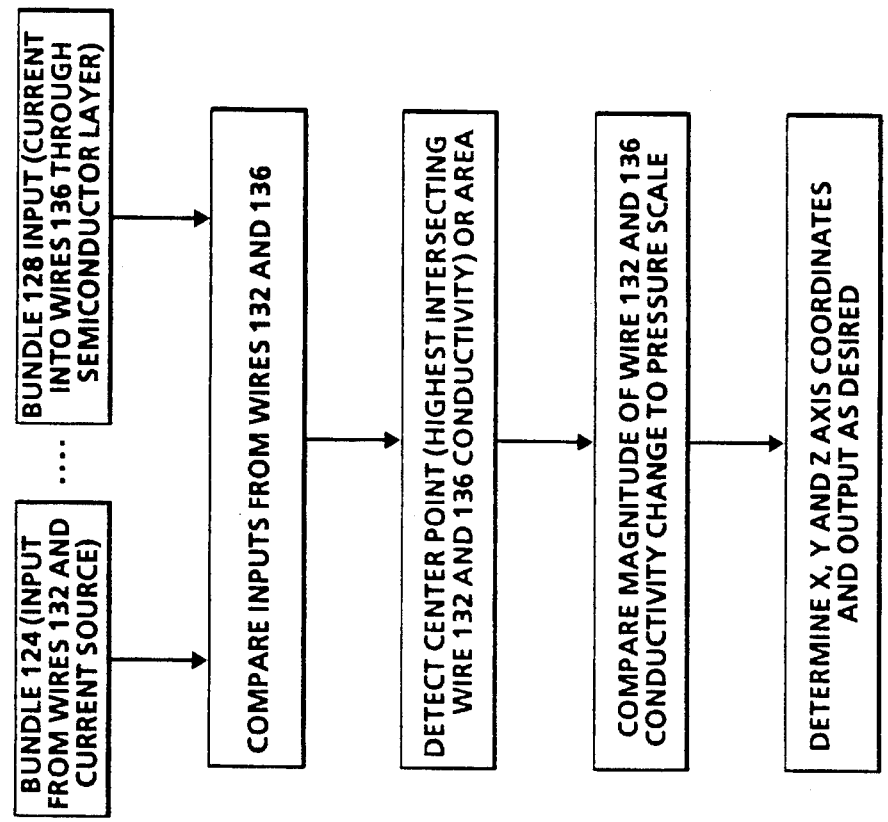
FIG. 6A is a block diagram showing one embodiment of an input pad processor of the present invention.

Processor 122 as shown in FIG. 2, and as described in greater detail in association with FIG. 6A, may be employed in certain cases such that only one or two of the address outputs (x, y and/or z) from the processor are used. For example, if a user wishes to vary the intensity of one color in a printer, the volume from a speaker or make any similar other one dimensional amplitude adjustment, the desired user input may be accomplished by coupling the device with input pad 120 so as to to utilize using only y or z axis address information from processor 122. Three dimensional objects (images on screens or in computer memory, models to be formed, prints on paper) may be be created and modified using the user interface of the present invention. Processor 122 may also enhance its pressure detecting capability via calibration keyed to the area covered by the object (such as a finger) used to increase conductivity between sets of wires 132 and wires 136 at over the region where pressure is applied on upper layer 126 of input pad 120. Processor 122 may simply be calibrated to assign a z-axis value according to the size of area covered under a fixed scale, or may be more precisely employed according to a programmable calibration that assigns z-axis values according to the area covered, for example, by an individual user's fingerprint at varying pressures. As a user places increasing pressure on upper pad layer 126, the compressible tip of the finger increasingly speads to cover a larger number of specific intersections of wires 132 and wires 136, which are correspondingly identified by processor 122 as having an increasing z—axis address component. In this manner, increased pressure sensitivity is acheived.

Lower pad layer 130 may be assembled in a manner identical to pad layer 126, and may have varying deformability, wire spacing or other characteristics according to the desired application. The set of parallel wires 132 in upper pad layer 126 and the set of wires 136 in lower pad layer 130 are of metal (or other conductive material); the wire sets may be embedded in a molten (cast) layer of semiconductive or resistive material, sandwiched and fixed in position between two sheets or cast layers of semiconductive or resistive material, or otherwise positioned in each upper and lower pad layer. Preferably, wires 132 and 136 are emplaced in the semiconductive material as close together as possible, so as to provide the highest degree of precision as to the x, y and z coordinate address signal produced by processor 122 of input pad 120. Once embedded in each respective semiconductive or resistive layer, one end of each wire terminates by a wire bundle at processor 122, while the other end of each wire terminates without conductive connection. As the wire sets are collected at connectors 134 and 138 along one edge of upper pad layer 126 and lower pad layer 130 to form a wire bundle terminating at processor 122, they are preferably coated with a highly insulative material so as to prevent conductive or resistive "crossover" between the wires as bundled for routing to processor 122. In this manner, false readings as to the appropriate x, y or z address generated by input pad 120 are prevented.

Figure 3:
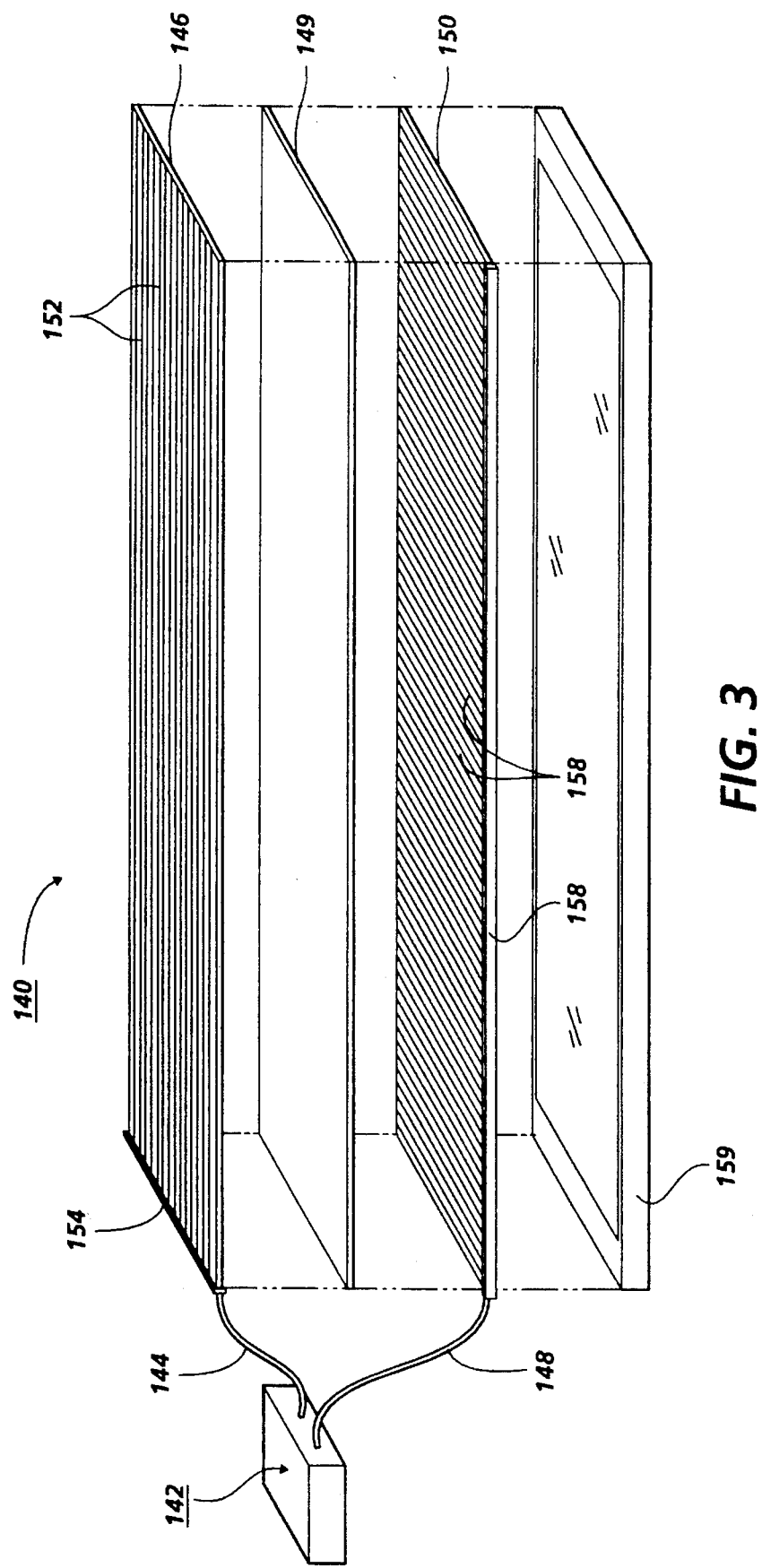
FIG. 3 is an exploded view of another embodiment of the pressure sensitive input pad of the present invention.

FIG. 3 shows an exploded view of user interface 140 of the present invention, in which upper pad layer 146, insulating layer 149, lower pad layer 150 and lower pad retaining plate 159 are shown separated for purposes of clarifying the invention. User interface 140 has a processor 142 for processing input from wire bundle 144 attached to upper pad layer 146 and from wire bundle 148 attached to lower pad layer 150. One end of each of parallel wires 152 embedded in semiconductive upper pad layer 146 are assembled along edge 154 so as to be collected to form wire bundle 144; likewise, one end of each of parallel wires 156 embedded in semiconductive lower pad layer 150 are assembled along edge 147 so as to be collected to form wire bundle 148.

Upper pad layer 146 in user interface 140 is assembled as shown in FIG. 3 such that wires 132 are cross wires 136 in lower pad layer 130. Upper pad layer 146 is separated from lower pad layer 150 by deformable semiconductive (or resistive) layer 149, such that pressure on upper pad layer 146 causes it to deflect towards lower pad layer 150, thereby decreasing the relative distance between wires 152 and wires 156 at the pressure point on upper pad layer 146. When pressure is applied to the outer surface of upper pad layer 146, it deflects towards lower pad 150; processor 142 detects the corresponding changes in the resistance (or conductivity) between any of wires 152 and wires 156, permitting processor 142 is to determine the x and y address coordinates of that pressure. Processor 142 also detects the magnitude of the increase in conductivity (or decrease in resistance) between the particular wire 152 and wire 156 at the pressure point on upper layer 146, by comparing the decrease in resistance (or increase in conductivity) between the particular wire 152 and particular wire 156 to a predetermined reference resistance (or conductance) level, so as to determine the z axis component to the three-dimensional address generated by processor 142 of user interface 140. Lower pad backing plate 159 is also shown in FIG. 3, and forms the lower support surface of user interface 140.

Figure 4:
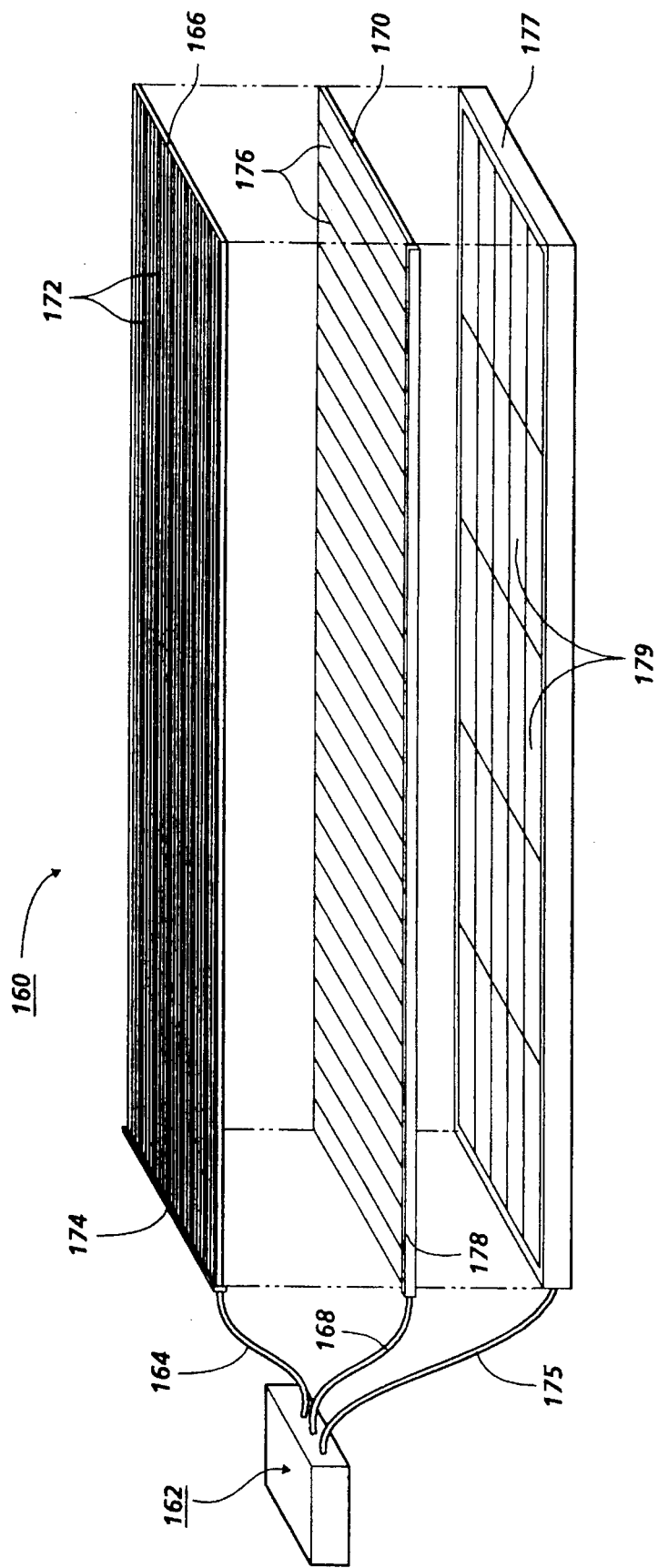
FIG. 4 is an exploded view of another embodiment of the pressure sensitive input pad of the present invention.

FIG. 4 shows an exploded view of user interface 160 of the present invention, in which upper pad layer 166, middle pad layer 170 and lower matrix board 177 are shown separated for purposes of clarifying the present invention. User interface 160 has a processor 162 (described in greater detail in association with FIG. 6B) for processing input from wire bundle 164 attached to upper pad layer 166 and from wire bundle 168 attached to middle pad layer 170. Processor chip 162 may be remotely located (as shown in FIG. 4) or may be directly mounted as chip on lower matrix board 177.

Every fifth wire of twenty-five (25) wires 172 embedded in upper pad layer 166 are conductively connected along edge 164 to a master set of lead wires, such that only the five "master" wires form wire bundle 164 and are electrically connected to processor chip 162; likewise, every fifth wire of twenty-five (25) wires 176 embedded in middle pad layer 170 is connected along edge 174 to a master set of lead wires such that only five wires are required in wire bundle 168 to connect all wires in middle layer 170 to processor chip 162.

As pressure is applied to a point or area on the upper surface of upper pad layer 166, upper pad layer 166 deflects towards middle pad layer 170. With the narrowing of the gap between upper pad layer 166 middle pad layer 170, the semiconductive material of which the upper and middle pad layers are made permit conductivity to increase, thus indicating the location and degree of the pressure applied to be identified in each particular quadrant of wires formed by repeating wires sets 172 and sets 176. Lower matrix board 177 includes a series of conductive pads 179, with each pad 179 spanning along the "x" axis each particular set of five wires 172 in upper pad layer 166 and also spanning along the "y" axis each particular set of five wires 176 in middle pad layer 170. Processor 162 may be individually connected (in parallel circuit) with each conductive pad 179 on lower matrix board 177. Alternatively, each conductive pad 179 may be serially wired, with a resistor separating each conductive pad such that a discrete level of conductivity is associated with each conductive pad 179. A predetermined current is applied to wires 176 of middle pad layer 170 via processor chip 162; pressure applied against the upper surface of upper pad layer 166 causes middle pad layer 170 to deflect towards conductive pads 179 on lower matrix board 177. When the conductance between a wire in middle pad layer 170 and a particular conductive pad 179 is varied, processor 162 can discriminate this change in conductance as relating to a discrete range of conductance so as to identify the particular conductive pad 179 where the pressure is applied. In this manner, the magnitude of the force applied and the location of the pressure in any one of the particular matrix of "detection zones" formed by the twenty-five wires (in five-by-five sets 172 through 176) is also identified. When conductor pads 179 are wired in series, user interface pad 160 therefore requires only 11 wires (five in bundle 164, five in bundle 168 and one in wire 175) to identify a precise x, y and z coordinate address by applying pressure to a user interface of virtually any size. The number of wires forming each quadrant of upper pad layer 166 and middle pad layer 170 sets of wires may be altered (e.g. using a 3×10, or 8×4, or virtually any size matrix rather than the 5×5 matrix disclosed above); accordingly, the corresponding dimensions of the conductor pads in the lower matrix board 177 may be modified without departing from the spirit of the present invention as shown in FIG. 4.

Figure 5:
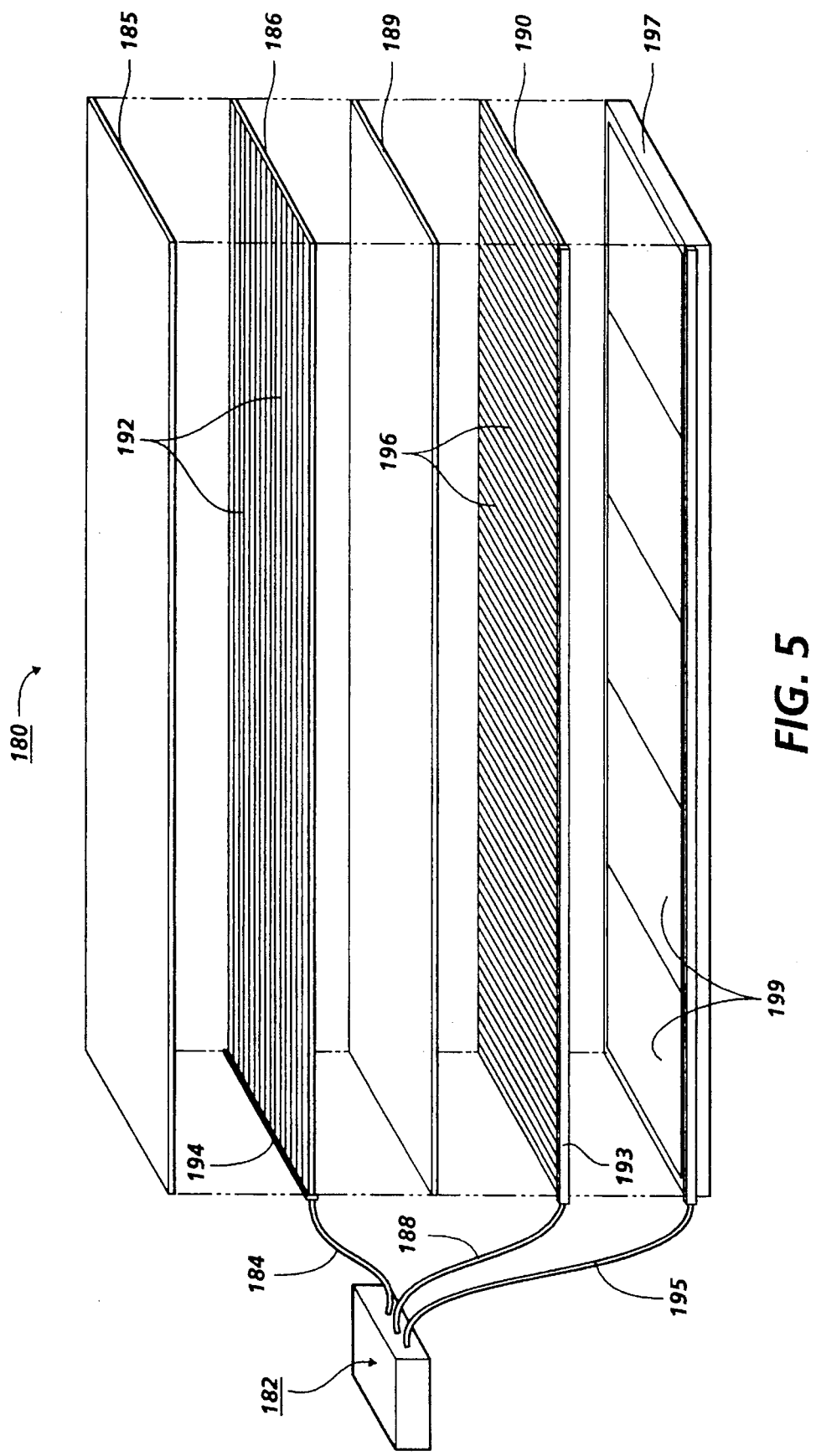
FIG. 5 is an exploded view of another embodiment of the pressure sensitive input pad of the present invention.

FIG. 5 shows an exploded view of user interface 180 of the present invention, in which upper protective surface 185, upper pad layer 186, semiconductive layer 189, middle pad layer 190 and lower board 197 are shown separated for purposes of clarifying the present invention. User interface 180 has a processor chip 182 for processing input from wire bundle 184 attached to upper pad layer 186 and from wire bundle 188 attached to middle pad layer 190. Every fifth wire 196 embedded in middle pad layer 190 is connected along edge 193 to a master set of lead wires, such that only the five master leadwires form wire bundle 188 so as to electrically connect middle pad layer 190 to processor chip 182. Wire bundle 195 individually connects each conductive strip 199 on lower board 197 to processor 182. The width of each conductive strip 199 on lower board 197 corresponds to each particular set of wires 196a through 196f in middle pad layer 190.

As pressure is applied to a point or area on upper protective surface 185, upper pad layer 186 deflects towards middle pad layer 190. With the narrowing of the gap between upper pad layer and 186 middle pad layer 190, semiconductive layer 189 permits conductivity to increase between upper pad layer 186 and middle pad layer 190, thus indicating the location and degree of the pressure applied to be identified as being in each particular set of wires formed by repeating sets of wires 196. Pressure against the upper surface of upper pad layer 186 also causes middle pad layer 190 to deflect towards conductive strips 199 on lower board 197. Accordingly, when conductance between a wire in a particular set of wires in middle pad layer 190 and a particular conductive strip 199 is varied, processor chip 182 can discriminate this change in conductance as relating to a discrete range of conductance, thereby identifying the particular conductive strip 199 where the change in conductance is detected. In this manner, the deflection of middle pad layer 190 with current carrying wires 196 towards a particular conductor strip 199 permits the x, y and z address associated with the pressure to be identified by processor 182. The user interface shown in FIG. 5 may be particularly useful in applications similar to user interface 14 shown in FIG. 1, in which a flexibly employed rectangular pad can be effectively used. The number of wires forming each set of wires in middle pad layer 190 may be altered and the corresponding width of the conductor strips 199 may be modified without departing from the spirit of the present invention as described in conjunction with FIGS. 4 and 5.

FIG. 6A shows a block diagram of one embodiment of the input pad processor of the present invention, such as may be employed with the FIG. 2 or 3 input pads; the FIG. 2 input pad will be used in conjunction with the FIG. 6A block diagram for the purpose of describing the functions of the processor. Processor 122 as shown in FIG. 2 uses an current source to individually impart a direct current voltage to wires 132 of upper layer 126 via wire bundle 124 as shown in FIG. 2, which (as shown by dotted line in FIG. 6A) migrate through a semiconductive layer to wires 136. When upper input pad layer 126 is depressed at a certain pressure point, the processor 122 uses compares the inputs obtained from wire(s) 132 and wire(s) 136. Processor 122 thereby detects the center point (or area depending on the application, area) to determine the highest input conductivity readings associated with the displacement of wire(s) 132 of upper layer 126 toward wire(s) 136 of lower layer 130. Processor 122 also uses information from the deflection of wires 132 toward wires 136 to determine the z axis coordinates or "force component" of the pressure on input pad 120, by comparing the magnitude of the conductivity change associated with the displacement of wire(s) 132 of upper layer 126 toward wire(s) 136 of lower layer 130 to a predetermined (or programmable) pressure scale. The precise x, y and z axis coordinates of the pressure on the input pad are thereby determined, and provided as a output to a printer, copier, computer or other device as desired. Processor 122 may also include a Computer Interface (not shown) for coupling processor 122 with a computer, printer or copier. The Computer Interface may be employed to vary the performance characteristics of the Input Comparator. As a user presses on upper pad layer 126 (by writing, drawing or other activity), the Input Comparator transfers the drawing input information in the x, y and z planes such as will be as well as the that pressure and movement is provided to processor 122 by wires 132 and wires 136 as described above.

Processor 122 may also enhance its pressure detecting capability via calibration keyed to the area covered by the object (such as a finger) used to increase conductivity between sets of wires 132 and wires 136 at over the region where pressure is applied on upper layer 126 of input pad 120. Processor 122 may simply be calibrated to assign a z-axis value according to the size of area covered under a fixed scale, or may be more precisely employed according to a programmable calibration that assigns z-axis values according to the area covered, for example, by an individual user's fingerprint at varying pressures. As a user places increasing pressure on upper pad layer 126, the compressible tip of the finger increasingly speads to cover a larger number of specific intersections of wires 132 and wires 136, which are correspondingly identified by processor 122 as having an increasing z-axis address component. In this manner, increased pressure sensitivity is acheived.

FIG. 6B shows a partial schematic view of one embodiment of the input pad processor of the present invention, such as may be employed with the FIG. 4 or 5 input pads; the FIG. 4 input pad will be described in conjunction with the FIG. 6B block diagram for the purpose of describing the functions of the processor.

Processor 162 as shown in FIG. 2 uses an current source to individually impart a direct current voltage to wires 162 of upper layer 166 via wire bundle 164 as shown in FIG. 4, which (as shown by dotted line in FIG. 6B) migrate through a semiconductive layer to wires 176. When upper input pad layer 166 is depressed at a certain pressure point, the processor 162 uses compares the inputs obtained from wire(s) 172 and wire(s) 176. Processor 162 thereby detects the center point over a particular conductor pad 179 in layer 177 (or area depending on the application, area) to determine the highest input conductivity readings associated with the displacement of wire(s) 172 of upper layer 166 toward wire(s) 176 of lower layer 170. Processor 162 also uses information from the deflection of wires 172 toward wires 176 to determine the z axis coordinates or "force component" of the pressure on input pad 160, by comparing the magnitude of the conductivity change associated with the displacement of wire(s) 172 of upper layer 166 toward wire(s) 176 of lower layer 170 to a predetermined (or programmable) pressure scale. The relative x and y coordinates of the pressure on the input pad are pinpointed by comparing wire 176 to conductor pad 179 conductivity to identify the particular conductor pad 179 underlying the pressure from upper layer 166. The precise x, y and z axis coordinates of the pressure on the input pad are thus determined, and provided as a output to a printer, copier, computer or other device as desired.

Figure 7:
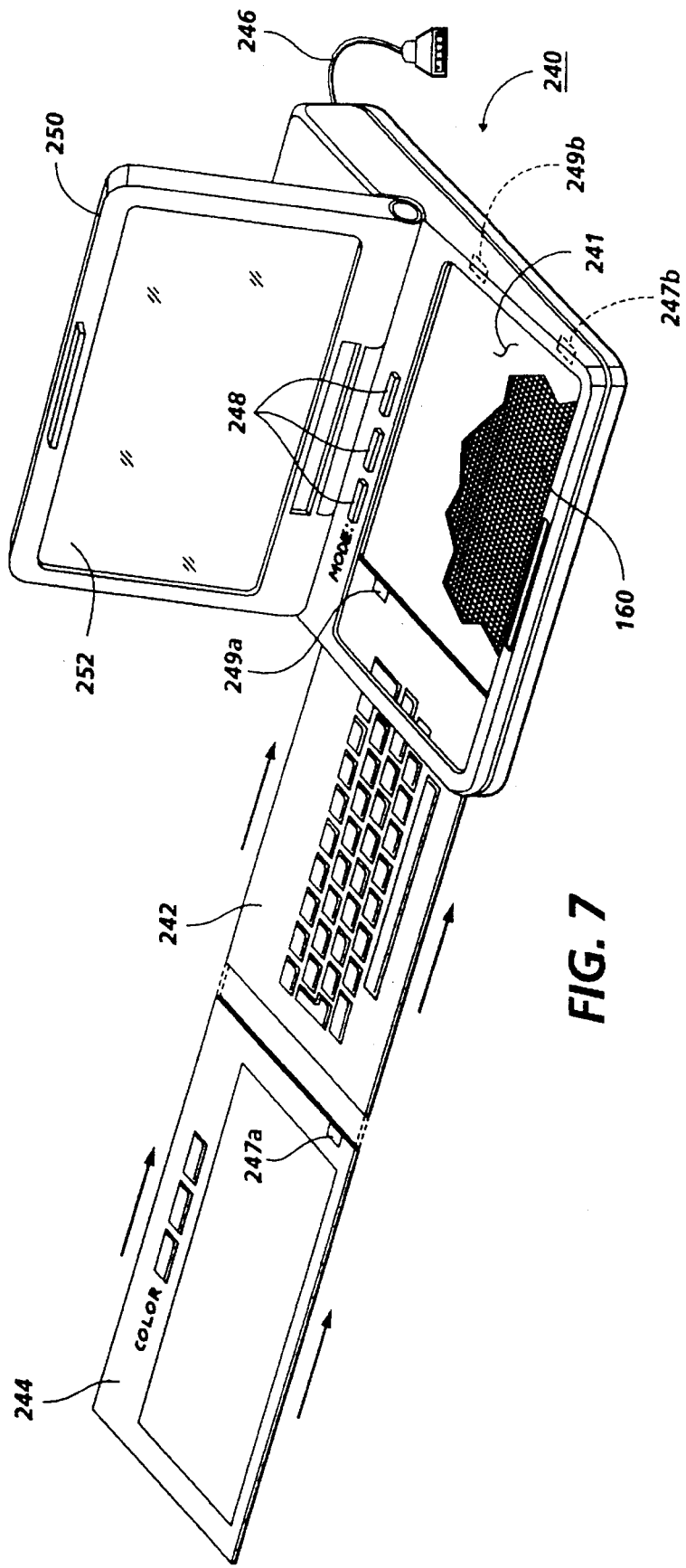
FIG. 7 is a perspective view, partially in section, showing a flexible keyboard and edit pallet data entry device incorporating the pressure sensitive input pad shown in FIG. 4.

FIG. 7 shows a flexible keyboard and edit pallet data entry terminal 240 that may employ a user interface 160 as shown in FIG. 4 (or another user interface of the present invention as shown in FIGS. 2, 3 or 5). A keyboard template 242, freehand pallet 244 or other overlay may be emplaced over protective layer 241, such that a variety of tasks may be accomplished using user interface 160. Keyboard template 242 includes a conductive tab 247a such that when keyboard template 242 is eraplaced in terminal 240, the appropriate keyboard function of the user interface is initiated by closing switch 247b; likewise, when freehand pallet 244 (or other template overlay) is inserted in terminal 240, conductive tab 249a initiates the appropriate drawing function of the user interface by closing switch 249b. Terminal 240 includes a connector 246 for interfacing, uploading or downloading with peripheral devices; mode switches 248 permit the various functions for which user interface 160 is adapted to be selected. Panel 250 supports screen 252 for monitoring inputs made with user interface 160. Screen 252 may include a standard video touch screen such that other drawing, text and image functions can be activated or edited without altering the implementation of user interface 160.

Figure 8:
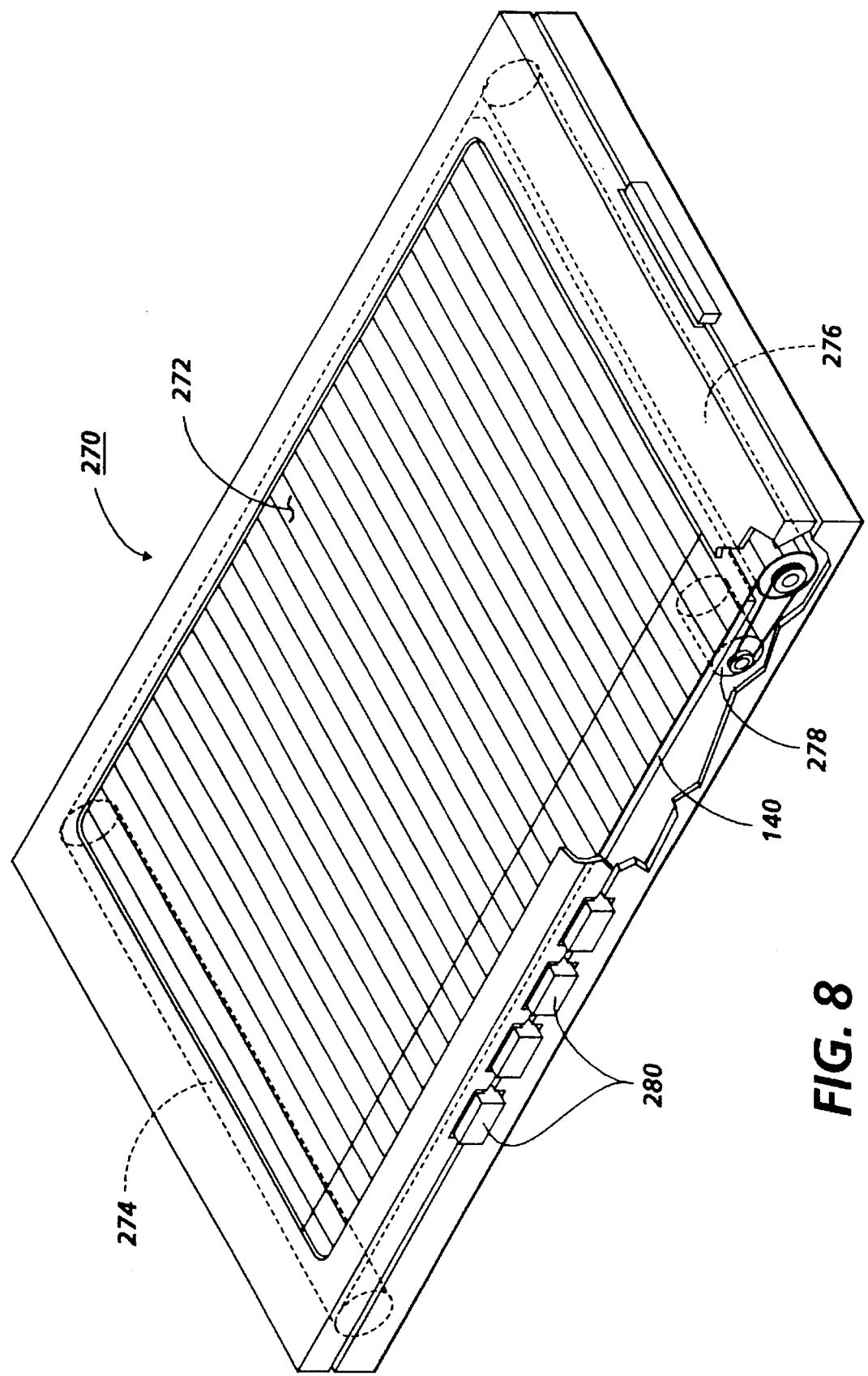
FIG. 8 is a perspective view, partially in section, showing an electronic scratch pad incorporating the pressure sensitive input pad shown in FIG. 3.

FIG. 8 shows an electronic drawing pad 270 that may employ a user interface 140 as shown in FIG. 3 (or another user interface of the present invention as shown and described in accordance with FIGS. 2 or 4–5). Sheet 272 may be mounted for movement between rollers 274 and 276 by motor 278; rollers 274 and 276 and motor 278 are mounted on the frame formed by the body of drawing pad 270. Buttons 280 control motor 278 so as to variably position sheet 272 over user interface 140. By writing or drawing on sheet 272, an operator can utilize user interface 140 to input three dimensional data into computer memory (not shown) linked with electronic scratch pad 270.

While the present invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A user interface apparatus having a conductivity sensing processor for detecting a set of x, y and z axis address components of said user interface according to changes in conductivity between conductors in an input pad, said input pad comprising:

a first level having a plurality of x direction parallel conductors individually electrically connected to and carrying a current from said processor;

a compressible semiconductive layer; and a second level having a plurality of y direction parallel conductors individually electrically connected to said processor, said semiconductive layer being interposed between said first level and said second level, said x and y conductors forming a matrix, whereby said processor detects the x and y axis address components as a function of pressure exerted on said first level resulting in an increase in conductivity between said first level of x conductors and said second level of y conductors and whereby said processor detects the z axis address component of said pressure on said first level according to a comparison of a magnitude of said increase in conductivity between said x and y conductors to a predetermined pressure scale.

2. A user interface apparatus having a conductivity sensing processor for detecting a set of x, y and z axis address components according to changes in conductivity between conductors in an input pad, said input pad comprising:

a first level having a plurality of x direction parallel conductors individually electrically connected to and carrying a current from said processor;

a compressible semiconductive layer; and a second level having a plurality of y direction parallel conductors individually electrically connected to said processor, said semiconductive layer being interposed between said first level and said second level, said x and y conductors forming a matrix wherein said x conductors of the first level are embedded in one surface of said semiconductive layer opposed from said one surface thereof whereby said processor detects the x and y axis address components as a function of pressure exerted on said first level resulting in an increase in conductivity between said first layer of x conductors displaced towards said second layer of y conductors and whereby said processor detects the z axis address component of said pressure on said first level according to a comparison of a magnitude of said increase in conductivity between said x and y conductors to a predetermined pressure scale.

3. A user interface apparatus having a conductivity sensing processor for detecting a set of x, y and z axis address components according to changes in conductivity between conductors in an input pad, said input pad comprising:

a first level having a plurality of x direction parallel conductors individually electrically connected to and carrying a current from said processor;

a compressible semiconductive layer; and a second level having a plurality of y direction parallel conductors individually electrically connected to said processor wherein said y conductors of the second level are embedded in another surface of said semiconductive layer, said semiconductive layer being interposed between said first level and said second level, said x and y conductors forming a matrix, whereby said processor detects the x and y axis address components as a function of pressure exerted on said first level resulting in an increase in conductivity between said first layer of x conductors displaced towards said second layer of y conductors and whereby said processor detects the z axis address component of said pressure on said first level according to a comparison of a magnitude of said increase in conductivity between said x and y conductors to a predetermined pressure scale.

4. A user interface apparatus having a conductivity sensing processor for detecting a set of x, y and z axis address components according to changes in conductivity between conductors in an input pad, said input pad comprising:

a first level having a plurality of x direction parallel conductors individually electrically connected to and carrying a current from said processor;

a compressible semiconductive layer; and a second level having a plurality of y direction parallel conductors individually electrically connected to said processor, said semiconductive layer being interposed between said first level and said second level, said x and y conductors forming a matrix wherein said x conductors of the first level are embedded in one surface of said semiconductive layer and wherein said y conductors of the second level are embedded in another surface of said semiconductive layer, whereby said processor detects the x and y axis address components as a function of pressure exerted on said first level resulting in an increase in conductivity between said first layer of x conductors displaced towards said second layer of y conductors and whereby said processor detects the z axis address component of said pressure on said first level according to a comparison of a magnitude of said increase in conductivity between said x and y conductors to a predetermined pressure scale.

5. The apparatus of claim 1, wherein said x conductors of the first level are cast in a first resilient semiconductive sheet and wherein said y conductors of the second level are cast in a second resilient semiconductive sheet.

6. The apparatus of claim 1, wherein said x and y conductors are thin wires comprising at least one metal selected from the group consisting of copper, tungsten and aluminum.

7. The apparatus of claim 1, further comprising a nonconductive outer sheet covering said first level for protecting said x and y conductors.

8. The apparatus of claim 1, further comprising a nonconductive rigid backing plate underlying said second level for supporting said y conductors when pressure is applied to said first level.

9. The apparatus of claim 1, further comprising a template overlying said first level for mapping a set of functions for input into a computer electronically connected to said processor according to pressure applied to said template toward said first level.

10. The apparatus of claim 1, further comprising a drawing sheet overlying said first level for inputting data into a computer electronically connected to said processor according to pressure applied to said drawing sheet toward said first level.

11. A user interface apparatus having a conductivity sensing processor for detecting unique x, y and z axis address components according to conductivity readings between conductors in an input pad, said input pad comprising:

a first level having n repeating sets of x direction parallel conductors, each individual x conductor in each repeating set being electrically connected to and carrying a current from said processor and to each corresponding x conductor in each n repeating set of x conductors;

a first compressible semiconductive layer;

a second level having m repeating sets of y direction parallel conductors, said first semiconductive layer being interposed between said first level and said second level, each individual y conductor in each repeating set being electrically connected to said processor and to each corresponding y conductor in each m repeating set of y conductors, said sets of x conductors in said first level aligned to cross said sets of y conductors in said second level so as to form a detection zone matrix, whereby an application of pressure on said first level increases conductivity between the x and y conductors crossing beneath said pressure so as to identify the x and y axis address within said detection zone and whereby said processor compares a magnitude of said increase in conductivity between said x and y conductors to a predetermined pressure scale so as to identify the unique z address component of said pressure;

a second compressible semiconductive layer underlying said second level; and a third level having a plurality of conductive pads underlying said second compressible semiconductive layer and being electrically connected to and individually identifiable by said processor according to said detection zone matrix, whereby said processor detects the unique x and y axis address of said pressure on said first level according to increased conductivity detected between said y conductors and said conductive pad.

12. The apparatus of claim 11, wherein said x conductors are cast in a first resilient semiconductive sheet and wherein said y conductors of the second level are cast in a second resilient semiconductive sheet.

13. The apparatus of claim 11, wherein said x and y conductors are thin wires comprising at least one metal selected from the group consisting of copper, tungsten and aluminum.

14. The apparatus of claim 11, further comprising a nonconductive outer sheet covering said first level for protecting said x and y conductors.

15. The apparatus of claim 11, wherein said x conductors of the first level are partially embedded in an upper surface of said first compressible semiconductive layer and wherein said y conductors of said second level are partially embedded in a lower surface of said second compressible semiconductive layer.

16. The apparatus of claim 11, further comprising a nonconductive rigid backing plate underlying said second level for supporting said y conductors when pressure is applied to said first level.

17. The apparatus of claim 11, further comprising a template overlying said first level for mapping a set of functions for input into a computer electronically connected to said processor according to pressure applied to said template toward said first level.

18. The apparatus of claim 11, further comprising a drawing sheet overlying said first level for inputting data into a computer electronically connected to said processor according to pressure applied to said drawing sheet toward said first level.

19. A printing machine having a user interface apparatus with a conductivity sensing processor for detecting a set of x, y and z axis address components of said user interface according to changes in conductivity between conductors in an input pad, said input pad comprising:

a first level having a plurality of x direction parallel conductors individually electrically connected to and carrying a current from said processor;

a compressible semiconductive layer; and a second level having a plurality of y direction parallel conductors individually electrically connected to said processor, said semiconductive layer being interposed between said first level and said second level, said x and y conductors forming a matrix, whereby said processor detects the x and y axis address components as a function of pressure exerted on said first level resulting in an increase in conductivity between said first level of x conductors and said second level of y conductors and whereby said processor detects the z axis address component of said pressure on said first level according to a comparison of a magnitude of said increase in conductivity between said x and y conductors to a predetermined pressure scale.

20. A printing machine having a user interface apparatus with a conductivity sensing processor for detecting a set of x, y and z axis address components according to changes in conductivity between conductors in an input pad, said input pad Comprising:

a first level having a plurality of x direction parallel conductors individually electrically connected to and carrying a current from said processor;

a compressible semiconductive layer; and a second level having a plurality of y direction parallel conductors individually electrically connected to said processor, said semiconductive layer being interposed between said first level and said second level, said x and y conductors forming a matrix wherein said x conductors of the first level are embedded in one surface of said semiconductive layer opposed from said one surface thereof, whereby said processor detects the x and y axis address components as a function of pressure exerted on said first level resulting in an increase in conductivity between said first layer of x conductors displaced towards said second layer of y conductors and whereby said processor detects the z axis address component of said pressure on said first level according to a comparison of a magnitude of said increase in conductivity between said x and y conductors to a predetermined pressure scale.

21. A printing machine having a user interface apparatus with a conductivity sensing processor for detecting a set of x, y and z axis address components according to changes in conductivity between conductors in an input pad, said input pad comprising:

a first level having a plurality of x direction parallel conductors individually electrically connected to and carrying a current from said processor;

a compressible semiconductive layer; and a second level having a plurality of y direction parallel conductors individually electrically connected to said processor wherein said y conductors of the second level are embedded in another surface of said semiconductive layer, said semiconductive layer being interposed between said first level and said second level, said x and y conductors forming a matrix, whereby said processor detects the x and y axis address components as a function of pressure exerted on said first level resulting in an increase in conductivity between said first layer of x conductors displaced towards said second layer of y conductors and whereby said processor detects the z axis address component of said pressure on said first level according to a comparison of a magnitude of said increase in conductivity between said x and y conductors to a predetermined pressure scale.

22. A printing machine having a user interface apparatus with a conductivity sensing processor for detecting a set of x, y and z axis address components according to changes in conductivity between conductors in an input pad, said input pad comprising:

a first level having a plurality of x direction parallel conductors individually electrically connected to and carrying a current from said processor;

a compressible semiconductive layer; and a second level having a plurality of y direction parallel conductors individually electrically connected to said processor, said semiconductive layer being interposed between said first level and said second level, said x and y conductors forming a matrix wherein said x conductors of the first level are embedded in one surface of said semiconductive layer and wherein said y conductors of the second level are embedded in another surface of said semiconductive layer, whereby said processor detects the x and y axis address components as a function of pressure exerted on said first level resulting in an increase in conductivity between said first layer of x conductors displaced towards said second layer of y conductors and whereby said processor detects the z axis address component of said pressure on said first level according to a comparison of a magnitude of said increase in conductivity between said x and y conductors to a predetermined pressure scale.

23. The apparatus of claim 19, wherein said x conductors of the first level are cast in a first resilient semiconductive sheet and wherein said y conductors of the second level are cast in a second resilient semiconductive sheet.

24. The apparatus of claim 19, wherein said x and y conductors are thin wires comprising at least one metal selected from the group consisting of copper, tungsten and aluminum.

25. The apparatus of claim 19, further comprising a nonconductive outer sheet covering said first level for protecting said x and y conductors.

26. The apparatus of claim 19, further comprising a nonconductive rigid backing plate underlying said second level for supporting said y conductors when pressure is applied to said first level.

27. The apparatus of claim 19, further comprising a template overlying said first level for mapping a set of functions for input into a computer electronically connected to said processor according to pressure applied to said template toward said first level.

28. The apparatus of claim 19, further comprising a drawing sheet overlying said first level for inputting data into a computer electronically connected to said processor according to pressure applied to said drawing sheet toward said first level.

* * * * *